P. KRAUSE.
BRAKE OPERATING MECHANISM FOR MOTOR VEHICLES.
APPLICATION FILED AUG. 26, 1908.
922,916.
Patented May 25, 1909.
2 SHEETS—SHEET 2.
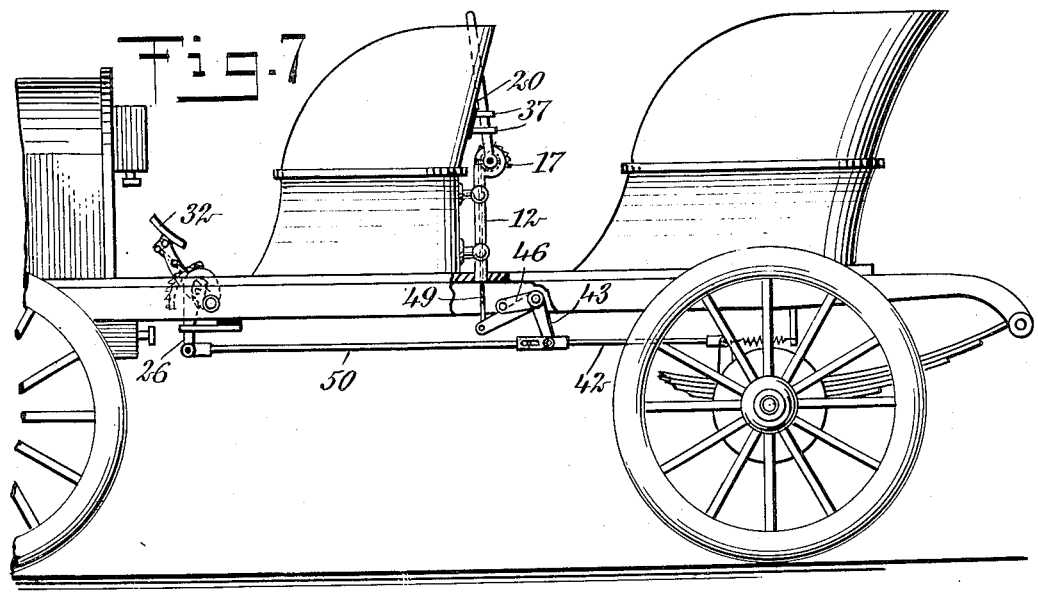
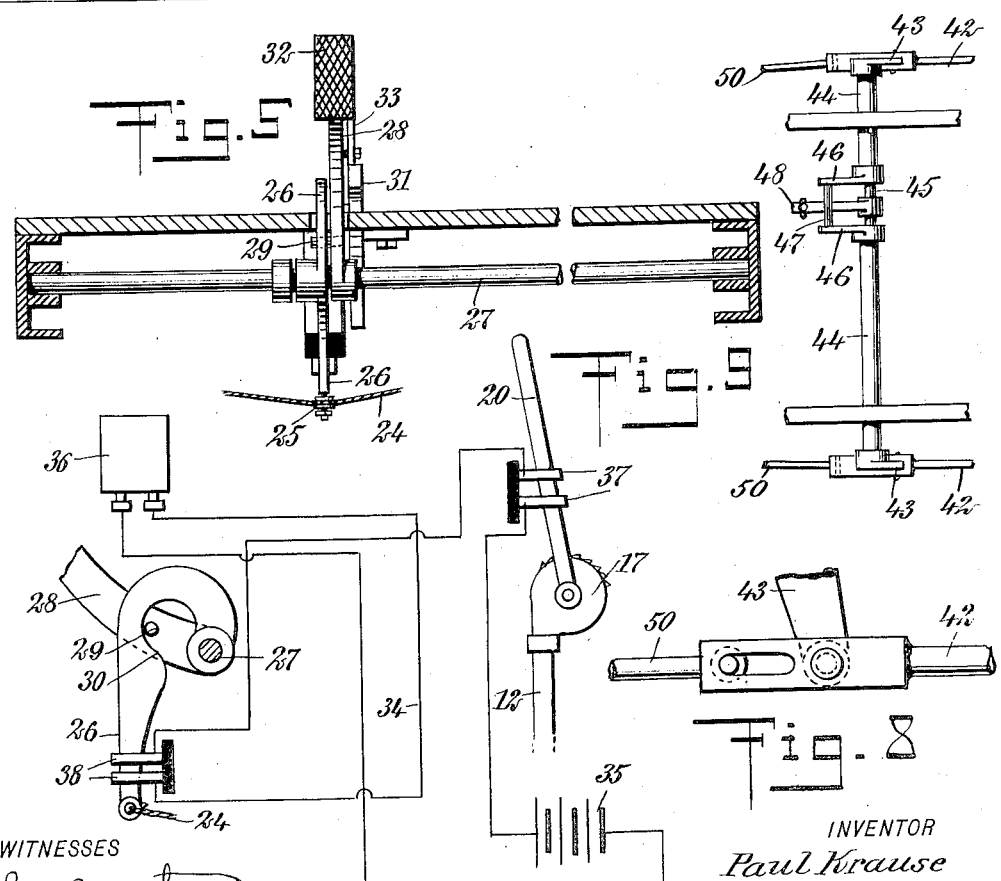
WITNESSES
INVENTOR
Paul Krause
BY
ATTORNEYS

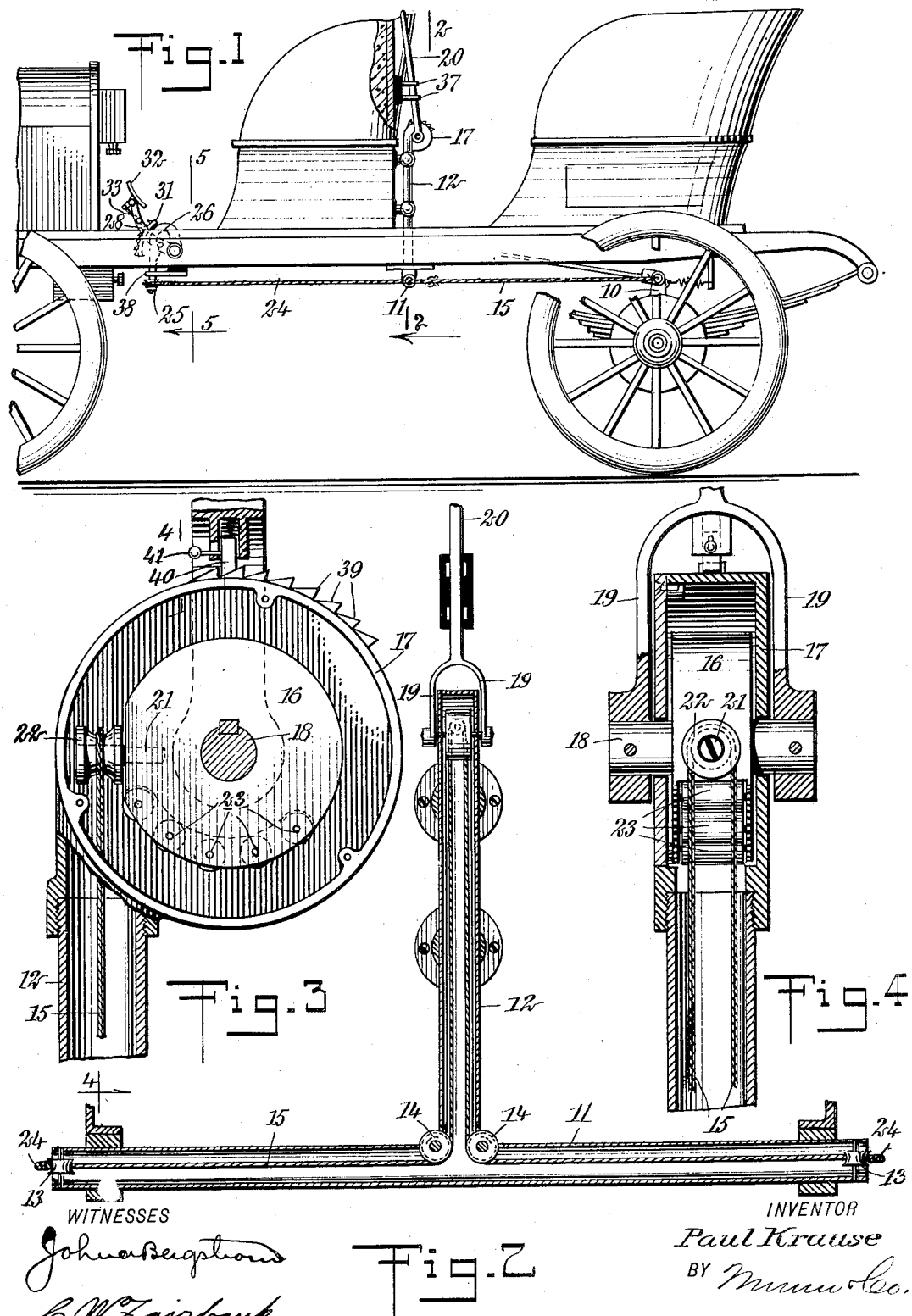

UNITED STATES PATENT OFFICE.

PAUL KRAUSE, OF BABYLON, NEW YORK.

BRAKE-OPERATING MECHANISM FOR MOTOR-VEHICLES.

No. 922,916.  Specification of Letters Patent.  Patented May 25, 1909.

Application filed August 26, 1908. Serial No. 450,274.

*To all whom it may concern:*

Be it known that I, PAUL KRAUSE, a citizen of the United States, and a resident of Babylon, in the county of Suffolk and State of New York, have invented a new and Improved Brake-Operating Mechanism for Motor-Vehicles, of which the following is a full, clear, and exact description.

This invention relates to certain improvements in brake-operating mechanism for motor vehicles, and more particularly to that type of mechanism illustrated in my previous application, Serial Number 401,791, filed November 12, 1907. In said application, I disclose means for operating a motor vehicle brake from adjacent either the front or the rear side of the vehicle and means for automatically breaking the ignition circuit for the engine of the vehicle upon the applying of the brake.

My present invention consists in certain improvements in the details of construction, whereby the entire mechanism operates more efficiently and easily.

Reference is to be had to the accompanying drawings, forming a part of this specification, in which similar characters of reference indicate corresponding parts in all the figures, and in which—

Figure 1 is a side elevation of a motor vehicle constructed in accordance with my invention, certain portions being broken away; Fig. 2 is a vertical section taken on approximately the line 2—2 of Fig. 1; Fig. 3 is a section through the cable-tightening drum shown in the upper portion of Fig. 2; Fig. 4 is a section through the casing for said drum, said section being taken on approximately the line 4—4 of Fig. 3; Fig. 5 is a transverse section on the line 5—5 of Fig. 1; Fig. 6 is a diagrammatic view of the ignition circuit and terminals for controlling the same; Fig. 7 is a side elevation of a motor vehicle provided with a slightly modified form of brake-operating mechanism; Fig. 8 is a detail showing a portion of the link connections on an enlarged scale; and Fig. 9 is a top plan view of the rock shaft and operating mechanism shown in Fig. 7.

In the specific form of mechanism illustrated in Figs. 1 to 6, inclusive, the vehicle is provided with two band brakes adjacent the two rear wheels thereof, and each brake is provided with an upwardly-extending operating lever 10. Extending transversely across the vehicle intermediate the front and rear thereof and rigidly secured to the body or to the chassis, I provide a tube 11 having open ends. Extending upwardly from the tube 11, intermediate its ends and preferably directly back of the front seat of the vehicle, I provide a second tube 12 having its lower end opening into the tube 11. At the ends of the transverse tube 11 are two pulleys 13, and at each side of the tube 12 and partially within the tube 11, are two other pulleys 14. These two tubes and their pulleys constitute the means for supporting the cable 15 of the brakes, and at the upper end of the tube is means for tightening said cable. One end of the cable is operatively connected to one brake lever 10 and the cable extends forwardly to one end of the tube 11, thence over the pulley 13, through the tube to the pulley 14, up the tube 12 to the operating mechanism, thence back down the tube and over the pulleys 14 and 13 and out the opposite end of the tube 11, from whence it leads to the brake of the second wheel.

The operating mechanism for tightening the cable preferably includes a drum 16, mounted within a stationary casing 17 and arranged substantially tangentially to the tube 12. The drum is connected to its shaft 18 and upon the outer ends of the shaft are secured the yoke arms 19 of an operating lever 20. The drum upon the periphery thereof carries an outwardly-extending pin 21, upon which is rotatably mounted a small pulley 22, over which the central portion of the cable 15 passes. Adjacent the pulley 22, the drum carries a plurality of rollers 23, each extending substantially parallel to the shaft 18 and having its outer surface substantially tangential with the outer surface of the drum. By rotating the drum 16, the pulley 22 and the looped portion of the cable are raised upwardly and the cable drawn through the tubes 12 and 11. The cable is unattached save at its ends and is free to pass over the pulleys 13, 14 and 22. Thus, in operating the handle 20, the same pressure is applied to both brakes and they will both operate substantially simultaneously. Should one brake operate before the other, the further movement would bring the second brake into play with the same force as the first brake.

As previously stated, the tube 12 and the handle 20 are disposed closely adjacent the back of the front seat of the vehicle, so as to be in position to be operated by a passenger on the rear seat. This operating mechanism is not designed for ordinary use in stopping the car, but is designed to be used only in case of emergency when the person on the front seat, whose duty it is to control the car, fails to do so.

Adjacent the front seat, I mount a foot pedal which may also be employed for operating the same brakes as those operated upon by the lever 20. As shown, a second cable 24 is provided, the ends of which are secured to the cable 15 at a short distance back of the ends of the tube 11. The central portion of the cable 24 passes over a pulley 25 on the lower end of a lever 26. This lever as shown more particularly in Fig. 6, is pivoted upon a shaft 27, and is curved so that it extends first upwardly, then forwardly and then downwardly below the level of the body of the car. Pivoted to the same shaft 26 is a treadle arm 28, having a laterally-extending stud or projection 29, adapted to engage with a cam surface 30 on the lever 26. By depressing the treadle lever, the projection 29 engages with the cam 30 and forces the lower end of the lever 26 forwardly to tighten the cable 24 and operate the two brakes. Any suitable means may be employed for holding the treadle lever depressed, but, as shown, I provide a stationary rack bar 31, and pivot to the upper end of the treadle 28, a foot plate 32. A pawl or catch 33 is carried by the foot plate and is adapted to engage with the rack bar, so that by varying the inclination of the plate 32, it may be locked in position or liberated.

As the cable 24 connects directly to the cable 15 and both cables at their centers extend over pulleys, it is evident that by the operating of either the foot pedal or the lever 20, both brakes of the vehicle will be simultaneously applied with the same pressure.

In connection with this brake-applying mechanism, I employ means for breaking the ignition circuit of the engine. Any form of electric ignition may be employed, but in Fig. 6, I have illustrated merely diagrammatically, a simple primary circuit. This includes wiring 34, a battery 35, and an induction coil 36, from the last of which leads the wires of the secondary circuit not shown. Included within the primary circuit, are two circuit closers, one adapted to be operated by the lever 26 and the other adapted to be operated by the lever 20. As shown, the circuit includes two terminals 37, supported adjacent the back of the front seat of the vehicle, and the lever 20 is so formed that when in its normal position it contacts with both of these terminals 37 and closes the circuit. Two similar terminals 38 are disposed between the lever 26, so that the circuit is also closed at this point when the brake is in released position. Upon the operating of either the lever 20 or the treadle, the brakes are not only applied but the ignition circuit is broken and the engine is therefore positively stopped.

As it is desired that the lever 20 be operated only upon comparatively rare emergencies, I provide means for locking the same in position after it has once been operated. As shown, the outer surface of the casing 17 is provided with a curved rack bar 39, and intermediate the junction of the two yoke arms 19 of the lever 20, is a spring-pressed dog 40. This dog fits within a recess and can only be lifted out of engagement with the teeth of the rack bar by means of a small knob or handle 41. This knob is normally concealed upon the rear side of the lever and ordinarily would not be noticed, save by one familiar with the details of the construction. Upon the operating of the brakes by the lever 20, they can be released only by raising the knob 41.

In Figs. 7, 8 and 9, I have illustrated a slightly modified form of construction, in which instead of employing cables connected to the brakes, I employ longitudinally-movable rods. Extending forwardly from each brake, is a rod 42 and the forward end of each rod is connected to a depending lever 43 carried by a corresponding sleeve 44. The two sleeves are mounted to turn on a supporting rod 45 and at their adjacent ends they carry forwardly-extending levers 46, connected together by a transverse rod 47. An arm 48 is mounted to turn on the supporting rod 45 and to engage with the under side of the transverse rod 47. The free end of the arm 48 is connected to both ends of a cable 49 which extends up through the tube 12, to operating mechanism substantially like that above described. By raising the front end of the arm 48, both of the sleeves 44 are caused to turn upon the supporting rod 45 and both of the brakes are simultaneously applied.

Instead of employing a cable 24 as in the form first described, I connect the lower end of the depending lever 26 to two links 50, each of which links has lost motion connections at its lower end with the corresponding rod 42, as illustrated in detail in Fig. 8. By reason of these lost motion connections, the links 50 are unaffected when the brakes are applied by means of the lever 20, but when the treadle is applied, the brakes may be operated and the levers 46 will rise out of engagement with the arm 48. Thus the brakes may be operated by either mechanism independently of the other.

Having thus described my invention, I claim as new and desire to secure by Letters Patent:

1. A motor vehicle having two brakes; a cable having its opposite ends connected to said brakes to operate the same, and a rotatable drum in engagement with said cable intermediate its ends for winding up said cable and operating said brakes simultaneously.

2. A motor vehicle having two brakes, a cable having its opposite ends operatively connected thereto, a rotatable drum, and means for connecting said cable intermediate its ends to the periphery of said drum, whereby the cable can move longitudinally in respect to the drum and may be wound upon said drum to operate both brakes simultaneously.

3. A motor vehicle having two brakes, a cable having opposite ends thereof operatively connected thereto, a drum, and a pulley carried by said drum adjacent the periphery thereof and extending out radially therefrom and adapted to engage with said cable intermediate its ends.

4. A motor vehicle having two brakes, a rotatable drum having a plurality of rollers substantially parallel to the periphery thereof, a pulley carried by said drum and extending outwardly from its periphery, and a cable having a central portion passing over said pulley and adapted to be wound upon said drum and having its opposite ends operatively connected to said brakes.

5. A motor vehicle having a vertically-extending tube, a drum mounted adjacent the upper end of said tube, a pulley carried by said drum at the periphery thereof, two brakes, a cable operatively connected to both brakes and having its intermediate portion extending over said pulley, and means for rotating said drum to raise the pulley.

In testimony whereof I have signed my name to this specification in the presence of two subscribing witnesses.

PAUL KRAUSE.

Witnesses:
   J. C. ROBBINS,
   JOHN A. BERGSTROM.